UNITED STATES PATENT OFFICE.

JULIEN ROUSSEL, LAURENT DELAUGRE, AND LUCIEN ROBIN, OF NANTES, FRANCE, ASSIGNORS TO PHILIP W. FLOWER, OF BRITON FERRY, AND WICKHAM FLOWER, OF LONDON, ENGLAND.

IMPROVEMENT IN THE PROCESS OF DECORATING TIN PLATES, CANS, &c.

Specification forming part of Letters Patent No. 43,463, dated July 5, 1864; reissue No. 7,556, dated March 13, 1877; application filed January 29, 1877.

*To all whom it may concern:*

Be it known that we, JULIEN ROUSSEL, born at Nantes, France, now or formerly residing at Nantes, a citizen of France, LAURENT DELAUGRE, born at Troyes, France, now or late residing at Nantes, a citizen of France, and LUCIEN ROBIN, born at St. Aignan, France, now or late residing at Nantes, a citizen of France, have invented a new and useful Improvement in Preserve-Cans and other articles manufactured with tin, and that we, PHILIP W. FLOWER and WICKHAM FLOWER, are the assignees of said invention, and of the Letters Patent of the United States therefor; and we do hereby declare that the following is a full and correct description thereof.

The nature of the invention consists in improved cans or articles of tin provided with indelible lettering, coloring, or designs produced by the process herein described; and further consists in the process herein described for the production of indelible lettering and designs, and not oxidizable colored surfaces, upon sheet-tin or tinned sheet-iron, by a combination of lithographic or plate printing, and the action of heat upon the surface of the tin, and upon the printing or colors printed upon such surface.

The base of the invention is the idea of the direct impression by printing on the tin, and the rendering of the same permanent and indelible. There is a great advantage in that step of the process which consists in printing directly upon the tin plates or articles, as distinguished from transferring, both in certainty and rapidity of action and economy of labor.

To enable others skilled in the art to make and use the invention, we proceed to describe the same and its application.

The invention has been originally and is chiefly designed for preserve-cans made of sheet-tin, and serves as a substitute for the former mode of labeling the preserve-cans, and of coating them with color, and we will therefore, in the following description, refer more particularly to the manner in which we employ our process for the coloring, ornamenting, and lettering of tin plates to be manufactured into cans, boxes, &c.; but it is obvious that the same process may be employed on other articles than tin plates.

Labels naming the contents of the cans, (meat, vegetable, fruit, or whatever it may be,) and name and address of manufacturer, &c., have been previously made either of paper or copper plates. These plates or other labels are liable to become detached from the cans by the wear to which they are frequently exposed; besides, the paper is apt to become wet and be destroyed, and the copper to become oxidized and covered with verdigris, especially during protracted sea-voyages, so that the lettering originally contained on the labels can no longer be discerned. In all these cases the result is that one knows no longer what the contents of the cans are, unless they are opened.

The cans, as manufactured previously, are frequently covered with a coat of color, put on by the usual mode of painting, in order to protect them from oxidization and other injury. Such a coat of paint, however, is subject to readily wear off.

The present invention is designed to obviate the said defects of the manufacture of preserve-cans heretofore in use.

A lithographic stone is prepared in the usual way for lithographic printing. The stone is to be of suitable size to correspond to a plate of sheet-tin large enough to cut any suitable number of strips of sheet-tin from for the manufacture of an equal number of cans. In order to produce a non-oxidizable colored surface on the tin the materials used are principally mineral colors, especially those having lead for a base, or metallic colors, or those having metal bases.

The oxides of various metals may be used as pigments. Suitable vehicles for mixing, such as linseed-oil, are used, the consistency being caused to be about that of the inks ordinarily used for lithographic printing. It is also desirable that suitable driers, such as lithargized drying-oil, should be used in mixing or grinding the colors.

The plate of sheet-tin is then placed upon the colored surface of the stone in the same manner as a sheet of paper is placed on a stone in the usual process of lithographic printing, and the stone, with the plate thereon, is then run through a lithographic press, after which the color will be found to be printed upon the surface of the sheet-tin. This process of printing is intended to substitute the mode of painting the cans heretofore in use, and has many advantages.

In order to produce the lettering or designs impressions may be obtained on tin by the means daily used in lithography. For this purpose another stone of the same size as the stone above mentioned is prepared for lithographic printing, and the lettering or designs which are to appear on the surface of the cans in place of labels are lithographed on the stone in the usual manner.

There are difficulties, however, attending this method, and accordingly we prefer the following:

The stone should be put into relief by any known means, and the relief should be sufficient to permit the inking without difficulty and rapidly. The inking material is then applied. Similar materials to those above specified may be used, but should be of a color different from that with which the sheet-tin has been covered, if at all. The inking may be done by a lithographic roller, or in any other known manner in that art. The inking or coloring matter to be transmitted onto a tin should be effected as dry as practicable.

Of course, there are to be on the stone as many lithograph designs or sets of lettering as the plates of sheet-tin are to be divided into strips, each intended to form the body of a can or similar article.

The plate of sheet-tin covered with the coat of colors above described is then placed upon the stone, the colored surface in contact with the lithograph face of the stone. The stone, with the plate thereon, is then run through the lithographic press, after which the lettering or designs will appear printed upon the colored surface of the sheet-tin.

If it is desired to have only the lettering or design, which shall serve the object of a label, and no coat of color on the surface of the tin, the process of coating with colors, first described, is, of course, dispensed with, and the second process of printing only applied.

After a number of plates of sheet-tin have been thus printed, they are placed in a properly-constructed furnace-chamber, where they are exposed to the action of a temperature sufficiently high to cause the printing to adhere tenaciously to the surface of the tin plates, the effect being somewhat as though it was slightly amalgamated with the surface of the tin. The proper degree of temperature required we have ascertained to be in general about 160° Fahrenheit. The temperature will, however, vary with the colors employed, and in some cases heat considerably higher should be used. The plates are to be very slowly heated, and from time to time to be inspected until the result required has taken place. The heating should continue about one and a half hour. With the higher heats a shorter time is proper.

We prefer to construct a series of revolving supports, (revolving around a horizontal axis,) upon which the plates are placed within the furnace-chamber. In this manner all the plates are exposed to an equal amount of heat, although the chamber may be hotter where it is in direct contact with the fire.

After the plates have been taken out and become cold the lettering, design, or coat of color will be found to be strongly united with the surface of the plates so as to be indelible. The plates will then be cut into as many strips as there are designs or sets of lettering on each plate, and the strips will then be manufactured into cans, or put to such use as desired.

In this manner cans may be provided with indelible labels and indelible coats of color if desired.

The manufacture of cans thus labeled and coated with color is considerably cheaper, takes up much less time than the manufacture of cans upon the plan heretofore in use.

It will be understood that in the manner above described any style of chromo-lithographic printing may be adapted to the purposes herein stated, as well as typographic printing, and also printing from engraved plates.

The process herein described may be applied to the manufacture of sheet-tin labels or other articles, not only for preserve-cans, but various other manufactures.

Having described the invention, what we claim therein as new, and desire to secure by Letters Patent, is—

1. The process of indelibly or permanently coloring, ornamenting, or lettering tin plates, cans, boxes, or other metallic articles, which consists in printing directly by the press upon the metal surface with suitable colors or inks, and then subjecting the articles so printed to the action of artificial heat, substantially as and for the purpose specified.

2. The process of decorating tin plates or cans by subjecting them to the operation of printing the colored surface and the lettering or designs directly upon the tin, substantially in the manner specified, and then subjecting the plates so decorated to heat in a furnace, substantially as and for the purpose described.

3. The process of decorating tin plates or cans by subjecting them to the action of printing the colored surface directly upon the tin, substantially in the manner specified, and then subjecting the plates to heat in a furnace, substantially as and for the purpose described.

4. The process of decorating tin plates or cans by subjecting them to the operation of printing the lettering or designs directly upon the tin, substantially in the manner specified, and subjecting the plates so decorated to heat in a furnace, substantially as and for the purpose specified.

5. The process of decorating tin plates, cans, boxes, or similar articles by imprinting colors, designs, or lettering directly upon the surface of the tin and then imparting to the articles so printed a rotary motion during the process of heating, substantially as and for the purpose described.

W. FLOWER.
PHILIP W. FLOWER.

Witnesses to the signature of PHILIP WILLIAM FLOWER:

CLEM'T S. B. GARDNER,
*Eaglesbush, Neath.*
ALEX. H. BARTLETT,
*Neath Road, Briton Ferry.*

Witnesses to the signature of WICKHAM FLOWER:

JAMES CHILD,
*Clerk to Messrs. W. & I. Flower & Nussey, Solicitors,* 1 *and* 2 *Gt. Winchester St. Building, London.*
HENRY Y. MARLS,
49 *Calthorpe St., Gray's Inn Road, London.*